S. R. HAWKINS.
Sheep Rack.
No. 36,905.
Patented Nov. 11, 1862.
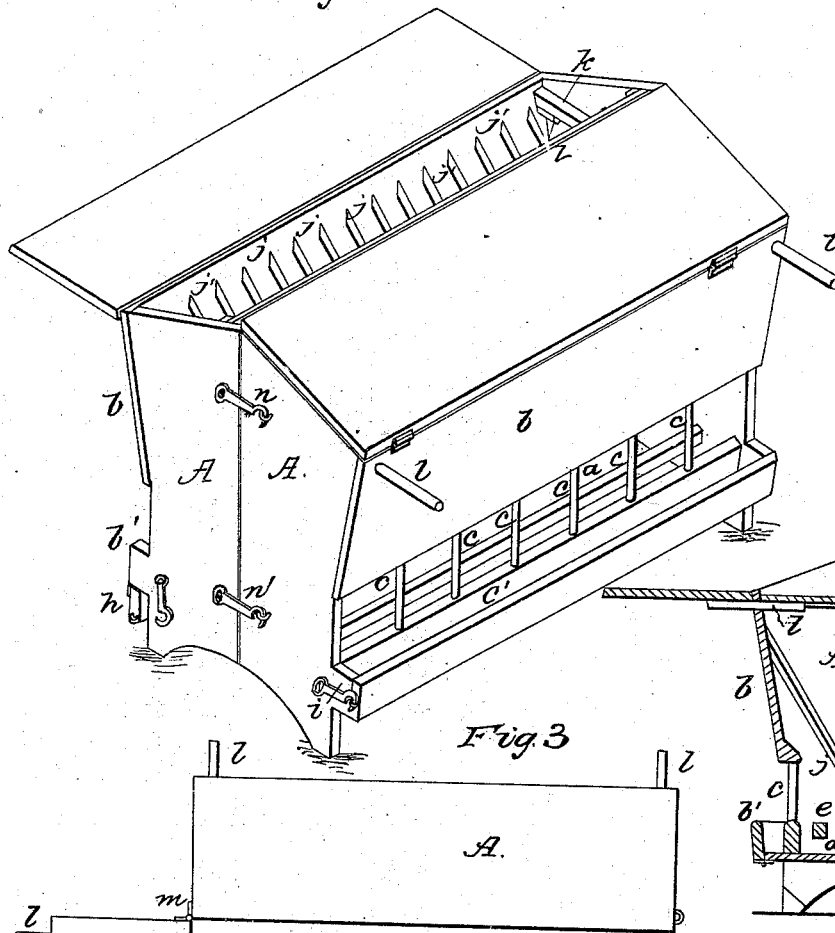
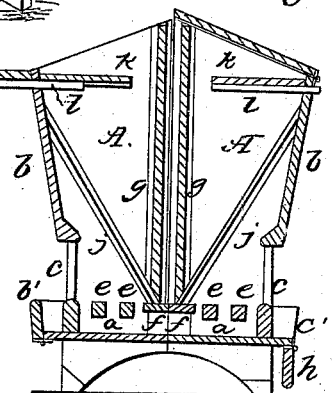
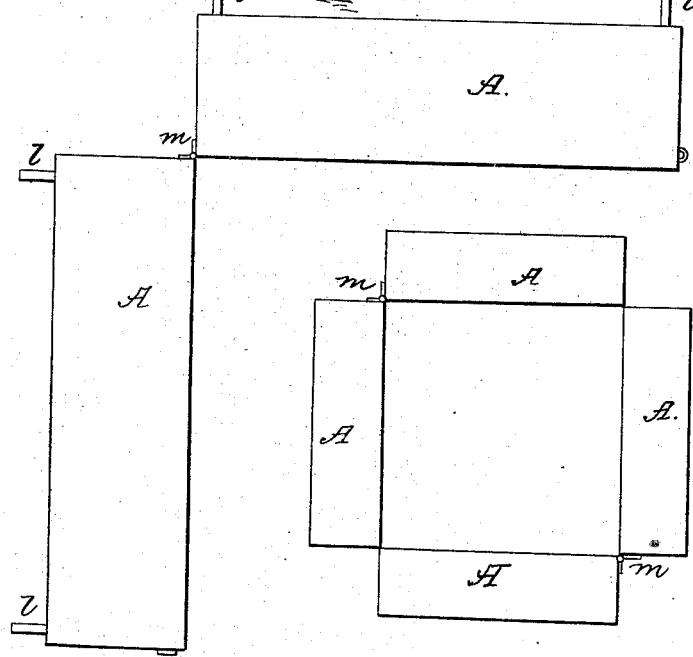
Witnesses
Gustave Dietrich
Edwin S. Frost
Inventor
Saml. R. Hawkins
Mason by Fenwick Lawrence
Attys.

UNITED STATES PATENT OFFICE.

SAMUEL R. HAWKINS, BEALLSVILLE, PENNSYLVANIA.

IMPROVED PORTABLE AND CONVERTIBLE SHEEP-RACK.

Specification forming part of Letters Patent No. 36,905, dated November 11, 1862.

*To all whom it may concern:*

Be it known that I, SAMUEL R. HAWKINS, of Beallsville, in the county of Washington and State of Pennsylvania, have invented a new and useful Improvement in Portable and Convertible Sheep-Racks; and I do hereby declare that the following is a full, clear, and exact description of the same, reference being had to the accompanying drawings, forming part of this specification, in which—

Figure 1 is a perspective view of my improved sheep-rack folded up, the cover of one of the racks being open and the grain-trough on one side being thrown down. Fig. 2 is a vertical transverse section of the rack as shown in Fig. 1. Fig. 3 is a top view of the rack open at an angle of forty-five degrees. Fig. 4 is a top view of two sections of the rack as folded or unfolded to an angle of forty-five degrees, and placed together so as to form a square inclosure, while serving as racks for feeding sheep. Fig. 5 is a plan of two sections of rack on same line.

Similar letters of reference in the several figures indicate corresponding parts.

The nature of my invention consists in a jointed folding rack with adjustable grain-troughs, and with hinged lids or covers supported by slide-bars.

My rack serves to either feed the sheep with hay or grain. It also answers as a shearing-bench and as a dry receptacle for hay or wool. It also serves as fence for inclosing stacks when two of them are folded or unfolded to an angle of forty-five degrees and brought together so as to form a square. It also can be extended in length, so as to occupy but a small amount of room widthwise, or can be folded so as to take up but a small amount of room lengthwise, and, finally, it affords facilities for small sheep feeding without being crowded by large sheep, and also separates the wasting hay from the seed, so that the seed may be conveniently gathered and saved.

To enable others skilled in the art to make and use my invention, I will proceed to describe its construction and operation.

A A are two narrow boxes of any suitable length, with horizontal bottom, vertical backs and ends, inclined closed fronts, and hinged bevel tops. The bottom $a$ of each box extends out on the front of the boxes, so as to form a support for a trough, $b'\ c'$, as shown. The fronts $b\ b$ are not continued down to the bottoms $a\ a$, but the space between is supplied with small vertical rounds $c\ c$, which constitute a division-grating for keeping the sheep apart, so far as their heads are concerned, while feeding with hay.

On a line with the top of the troughs $b'\ c'$ a second or false bottom, $e\ e$, is formed of slats, so that the loose hay may be caught and retained above the main bottom, while the grass-seed passes through upon the bottom in a separated condition to be gathered and saved, a passage, $f$, for its removal being provided, as represented, in the back $g$ of the boxes.

It should here be stated that the front part, $b$, of the troughs are hinged to the bottom $a$, and can be turned down, as illustrated at $h$, when it is desired to feed with hay, and again turned up and hooked in position, as represented at $i$, when it is desired to feed with grain out of the troughs.

Diagonally from near the base of the back $g$ of each of the boxes to near the top of the front of the boxes are extended or arranged narrow slats $j$, so as to form a hay-rack, as represented. This rack is situated far enough back of the slatted division-grating to keep the sheep from rooting their heads up into the hay and dampening the same with their breath.

On each end board, near the top, a grooved cleat, $k$, is fastened, and in the groove of said cleat a sliding support, $l$, is fitted and extended through the front of the boxes. These supports when shoved out stay the lids or tops of the boxes when the same are thrown open and down to a horizontal position. The lids thus opened answer as a table on which to shear the sheep, and the boxes, if not at that season of the year used for feeding with hay, serve as receptacles for the wool, the hinged tops, when closed, keeping the wool dry and secure.

Pairs of boxes or sections of a rack thus constructed are hinged together by their back boards at one end, as indicated at $m\ m$, and are furnshed with hooks and staples $n\ n'$ at their other end, as represented.

From the foregoing description it will be seen that if the object with the farmer is economy of space in a widthwise direction, the series of sections of the rack can be arranged on the same line against a partition, so that the sheep may feed all on one side; but that if economy of space in a longitudinal direction is his object the sections of rack can be folded on their hinges, so as to bring the back of one section in close relation to the back of another, and secured by the hooks and staples in this condition, as illustrated in Figs. 1 and 2. In this compact form the sheep will feed on opposite sides of the structure. Again, if it is desired to use the racks as a fence, all that has to be done is to unfold or fold two pair of sections to an angle of forty-five degrees and bring them together, so as to form a square around a stack or other object, and then fasten the hooks, cover the top with loose boards or leave it open, as may be desirable.

In feeding the sheep with grain the fronts of the troughs are hooked up; but in feeding with hay these fronts are let down, so as not to interfere with the sheep, it being necessary, in order to reach the hay of the racks, that the sheep be allowed to insert their heads between the rounds of the vertical division-grating.

My sectional convertible sheep-rack will answer admirably the wants of the farmer, and it will afford the sheep great comfort while feeding, and with it great saving in hay and seed will be effected, it being so organized that every facility for getting to the hay will be afforded, and still there is no chance for the sheep to trample upon the hay; and, finally, the whole structure is well ventilated from front to rear.

What I claim as my invention, and desire to secure by Letters Patent, is—

1. A sectional folding and convertible sheep-rack constructed substantially as and for the purposes herein described.

2. The combination of the hinged front of the troughs and the hay-rack, substantially as and for the purpose described.

3. The combination of the hinged lids, sliding supports, and sectional rack, substantially as and for the purpose described.

4. The combination of the vertical division-grating $c\ c$, slotted hay-rack $j\ j$, and sectional box A A, substantially as and for the purposes described.

SAMUEL R. HAWKINS.

Witnesses:
DAVID BUTZ,
JOHN McDONOUGH.